US010523502B2

(12) United States Patent
Vaidyanathan et al.

(10) Patent No.: US 10,523,502 B2
(45) Date of Patent: Dec. 31, 2019

(54) METHOD AND SYSTEM FOR CONFIGURATION OF DEVICES OF A CONTROL SYSTEM

(71) Applicant: ABB Schweiz AG, Baden (CH)

(72) Inventors: Aparajithan Vaidyanathan, Bangalore (IN); Raoul Jetley, Bangalore (IN)

(73) Assignee: ABB Schweiz AG, Baden (CH)

( * ) Notice: Subject to any disclaimer, the term of this patent is extended or adjusted under 35 U.S.C. 154(b) by 506 days.

(21) Appl. No.: 15/314,092

(22) PCT Filed: May 28, 2015

(86) PCT No.: PCT/IB2015/053998
§ 371 (c)(1),
(2) Date: Nov. 27, 2016

(87) PCT Pub. No.: WO2015/181758
PCT Pub. Date: Dec. 3, 2015

(65) Prior Publication Data
US 2017/0099183 A1  Apr. 6, 2017

(30) Foreign Application Priority Data

May 29, 2014 (IN) .......................... 2645/CHE/2014
Jun. 23, 2014 (IN) .......................... 3034/CHE/2014

(51) Int. Cl.
*G06F 15/16* (2006.01)
*H04L 12/24* (2006.01)
*G05B 19/042* (2006.01)

(52) U.S. Cl.
CPC ...... *H04L 41/0806* (2013.01); *G05B 19/0426* (2013.01); *G05B 2219/24034* (2013.01); *G05B 2219/25124* (2013.01)

(58) Field of Classification Search
CPC ............ H04L 41/0806; G05B 19/0426; G05B 19/052; G05B 2219/24034; G05B 2219/25124; G05B 2219/31104
See application file for complete search history.

(56) References Cited

U.S. PATENT DOCUMENTS 7,089,530 B1 *  8/2006  Dardinski .............. G05B 15/02
                                                          700/83
2010/0121890 A1 *  5/2010  Perkins ................. G06F 3/0482
                                                          707/805

(Continued)

FOREIGN PATENT DOCUMENTS

EP        1422629 A2    5/2004

OTHER PUBLICATIONS

International Preliminary Report on Patentability issued in connection with International Application No. PCT/IB2015/053998, dated Nov. 29, 2016, 7 pages.

(Continued)

Primary Examiner — Oscar A Louie
Assistant Examiner — Oluwatosin M Gidado
(74) Attorney, Agent, or Firm — Barnes & Thornburg LLP

(57) ABSTRACT

In aspects, the present invention discloses a method of configuring a plurality of devices of a control system using a configuration server connected to a plurality of data repositories using an engineering data gateway. The method comprises retrieving a first data set from a first data repository from the plurality of data repositories, retrieving a second data set associated with the first data set from a second data repositories from the plurality of data repositories, identifying at least one functional dependencies among the first data set and the second data set, generating a plurality of engineering artifacts including a configuration (Continued)

file, and transmitting the configuration file to a corresponding device from the plurality of devices.

8 Claims, 5 Drawing Sheets

(56) References Cited

U.S. PATENT DOCUMENTS

| | | | | |
|---|---|---|---|---|
| 2011/0078282 | A1* | 3/2011 | Wei | H04L 67/06 709/219 |
| 2011/0201317 | A1* | 8/2011 | Karandikar | G06Q 30/02 455/414.1 |
| 2013/0116986 | A1* | 5/2013 | Zhang | G06F 8/10 703/2 |
| 2014/0108269 | A1* | 4/2014 | Meijler | G06Q 10/103 705/301 |

OTHER PUBLICATIONS

International Search Report issued in connection with International Application No. PCT/IB2015/053998, prepared Jul. 29, 2015 and dated Aug. 4, 2015, 3 pages.

Written Opinion issued in connection with International Application No. PCT/IB2015/053998, prepared Jul. 29, 2015 and dated Aug. 4, 2015, 6 pages.

* cited by examiner

| TAGNAME | DESCRIPTION | SIG_TYPE | IS_TAG | IS_SPARE | CONTROLLER_NAME(CTRL NAME) | CONTROLLER_REDED CTRL NAME | HARDWARE_TYPE(CTRL TYPE) | CONTROLLER_IP | MODULE(CTRL_ADD) | COMMASTER_LOC(LOC LVL1 ADDR) | COMMASTER_TYPE(LOC LVL1 TYPE) | COMMASTER_LABEL(LOC LVL1 NAME) | MASTER_TEMPLATE (CLI NAME) | MASTER_CLID_NAME |
|---|---|---|---|---|---|---|---|---|---|---|---|---|---|---|
| HPC-TAG 10 | HPC-TAG 10 Description | AI | TRUE | | HPC800 1-2 | FALSE | HPC800 | 192.168.1.2 | 2 | A401 | A401_M | A401_M | A401_Template | 14_A401_M |
| HPC-TAG 11 | HPC-TAG 11 description | AI | TRUE | | HPC800 1-2 | FALSE | HPC800 | 192.168.1.2 | 2 | A401 | A401_M | A401_M | A401_Template | 14_A401_M |

Figure 5

METHOD AND SYSTEM FOR CONFIGURATION OF DEVICES OF A CONTROL SYSTEM

CROSS-REFERENCE TO RELATED APPLICATIONS

This application is a U.S. national stage of International Application Serial No. PCT/IB2015/053998, filed May 28, 2015, which claims priority to Indian Patent Application No. 2645/CHE/2014, filed May 29, 2014, and to Indian Patent Application No. 3034/CHE/2014, filed Jun. 23, 2014. The entire disclosures of the foregoing applications are hereby incorporated by reference.

FIELD OF INVENTION

The present invention relates to control systems and industrial automation. More particularly, the present invention relates to engineering and configuration of devices of a control system.

BACKGROUND

Design, engineering and commissioning of industrial plants and corresponding control system is a complex and time consuming process. To simplify the complexities involved, often the engineering is done in phases by various personnel of the automation service provider using various tools. The initial phase involves understanding customer requirements and generating plant specifications by the automation service provider. The automation service provider makes sale proposals by showing prospective plant topology diagrams created and stored using sales proposal tool. The prospective plant topology diagrams are used to present a plant network architecture overview to the customer in order to trigger further sales and bidding discussions in relation to the plant configuration and specifications.

In the subsequent phase, the prospective plant topology diagrams are converted to conventional plant topology diagrams by adding crucial details which are relevant in the context of control engineering and operation. The conventional plant topology diagrams is used by control engineers during configuration and commissioning of the devices of the control system which includes online device/system configuration, remote diagnostics, creation of system, control and hardware structures in the control application tools, export of topology diagram details to operations tools, etc. In this phase a multiplicity of tools are used, each of which has a separate data repository.

Conventionally, the conversion of prospective plant topology diagrams to conventional plant topology diagrams, and the configuration and commissioning of the devices of the control system is done manually by automation and control engineers. This task of conversion and subsequent configuration requires domain knowledge upon the part of the control engineer and therefore involves high skill related costs. Additionally, this task of conversion and subsequent configuration and commissioning of the devices often includes a lot of basic configurations which are redundant and repeatable which are currently performed manually, thereby leading to an inefficient delivery strategy for large scale engineering projects. Further, due to the semantic disconnect between various data models of the various engineering tools it is challenging to determine the dependency of a system element with respect to the system elements outside the tool's database.

Moreover, while performing this task of conversion and subsequent configuration and commissioning of the devices, the control engineer often has to refer to the requirements and configuration rules, plant engineering information such as I/O lists, etc., generated in the preceding phase, dependency among the engineering information and this makes the task time consuming, tedious, inefficient and prone to errors.

There have been several approaches which have attempted to solve the problems mentioned above. However, there is a need for an improved system and method that solves the problems mentioned above.

SUMMARY OF THE INVENTION

The above-mentioned shortcomings, disadvantages and problems are addressed herein which will be understood by reading and understanding the following specification.

In one aspect, the present invention discloses a method of configuring a plurality of devices of a control system using a configuration server connected to a plurality of data repositories using an engineering data gateway. Each data repository from the plurality of data repositories is associated with a corresponding engineering tool from a plurality of engineering tools.

The method includes retrieving a first data set from a first data repository from the plurality of data repositories. The first data set is stored in the first data repository in a first data model. Additionally, the method includes retrieves a second data set associated with the first data set from a second data repository from the plurality of data repositories. The second data set is stored in the second data repository in a second data model.

Further, the method includes identifying at least one functional dependency among the first data set and the second data set by converting the first data set and the second data sets to a graph database comprising a first node and a second node, created using the first data set and the second data set, and an edge between the first node and second node wherein the edge is indicative of the at least one functional dependency.

Furthermore, the method includes generating a plurality of engineering artifacts including a configuration file and at least one of system topology diagram, control logic diagram, face plate of a human machine interface using the first data set and the second data set in accordance with the at least one functional dependency; and transmitting the configuration file to a corresponding device from the plurality of devices for commissioning the operation of the device.

In an embodiment, the method further comprises validating the one or more engineering artifacts upon modification of the one or more engineering artifacts. In an embodiment, the step of generating a plurality of engineering artifacts includes configuring the plurality of engineering artifacts in accordance to one or more predetermined rules. In an embodiment, the method further comprises persisting the one or more engineering artifacts in the corresponding one or more data repositories. The step of persisting comprises receiving one or more subscription requests from the one or more data repositories, and publishing the one or more engineering artifacts to the one or more data repositories upon generation of the one or more engineering artifacts.

In an embodiment, the method further comprises generating one or more recommendations in relation to the one or more engineering artifacts using the first data set and the second data sets in accordance with the identified at least one functional dependency and one or more predetermined rules.

In an embodiment, the method further comprises assessing impact of a modification on the first data set based on the one or more relationships and rendering the assessed impact of the modification using the graph database.

In another aspect, the present invention discloses a system for configuring a plurality of devices of a control system. The system comprises a plurality of data repositories, an engineering data gateway communicatively coupled to the plurality of data repositories, and a configuration server operatively coupled to the plurality of data repositories using the engineering data gateway.

Each data repository from the plurality of data repositories is associated with a corresponding engineering tool from a plurality of engineering tools. The engineering data gateway is configured to convert one or more data sets from one or more data models to a graph database comprising a plurality of nodes, created using the one or more data sets, and a plurality of edges between the p-plurality of node wherein each edge from the plurality of edges is indicative of the at least one functional dependency The configuration server is configured to retrieve a first data set from a first data repository and a second data set from a second data repository, identify at least one functional dependency among the first data set and the second data set using the graph database, generate a plurality of engineering artifacts including a configuration file and at least one of system topology diagram, control logic diagram, face plate of a human machine interface, and transmit the configuration file to a corresponding device from the plurality of devices for commissioning the operation of the device. The configuration server generates the plurality of engineering artifacts using the first data set and the second data set in accordance with the at least one functional dependency.

In an embodiment, the engineering data gateway persists the one or more engineering artifacts in the corresponding one or more data repositories. In an embodiment, the engineering data gateway validates the one or more engineering artifacts upon modification of the one or more engineering artifacts prior to persisting the one or more engineering artifacts.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 5 shows a table having a snapshot of the signal/IO list used in power plant automation.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
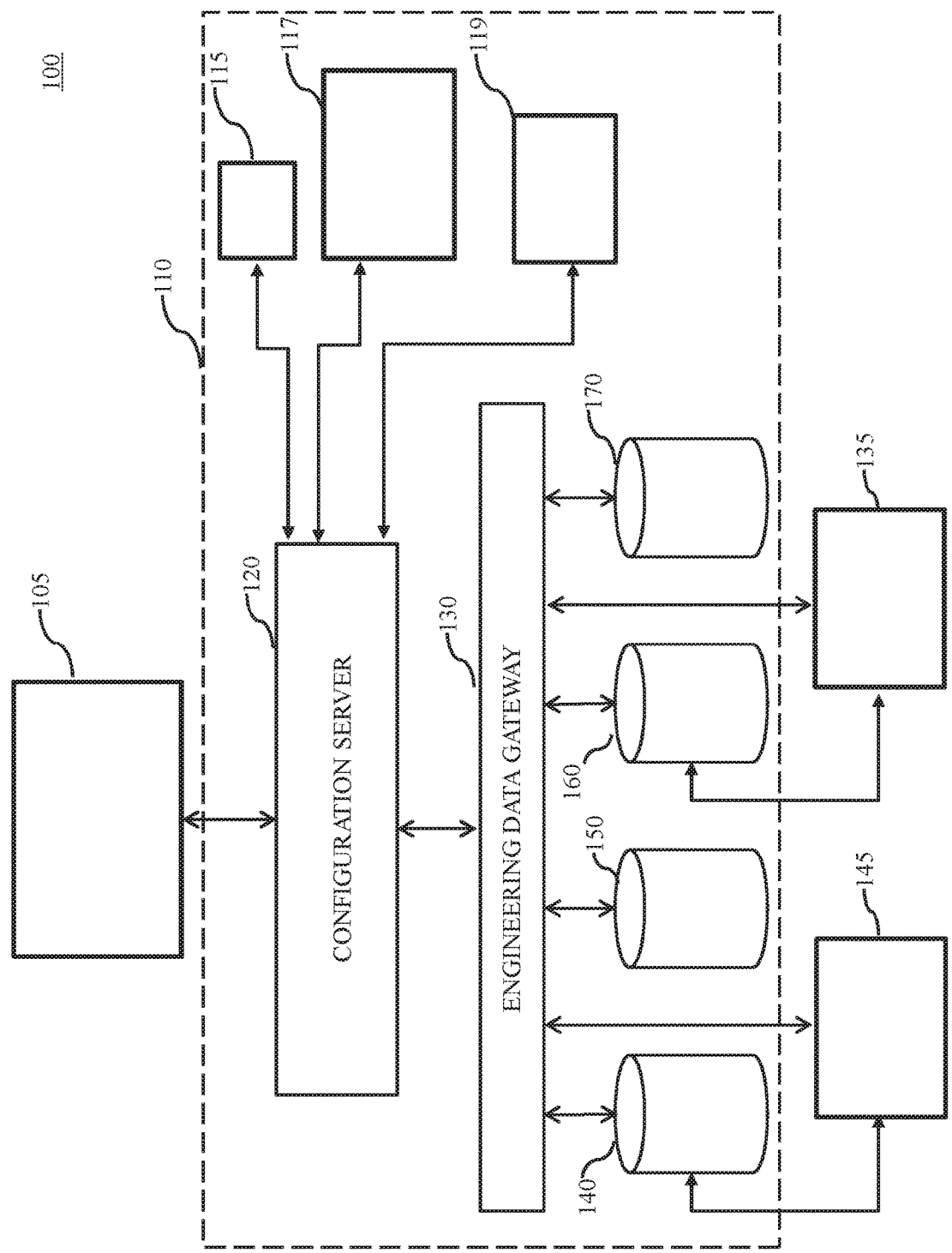
FIG. 1 illustrates a system for configuration of devices of a control system, in accordance with various embodiments of the present invention.

FIG. 1 illustrates a system 100 for configuration of devices of a control system, in accordance with various embodiments of the present invention. The system 100 includes a plurality of engineering tools installed on workstations 135 and 145, which are connected to a control system 100 for configuration and engineering of the control system 100. These engineering tools are used during various phases and stages of engineering by a multiplicity of personnel. Engineering data generated and configured using the engineering tools is stored on the plurality of corresponding data repositories 140, 150, 160 and 170.

Engineering data is stored on the data repositories using various data models and formats. For example, data pertaining to input-output (I/O) list is stored using a tabular spreadsheet based data model on data repository 140. Similarly, data relating to control logic is stored in an extensible mark-up language (XML) based file model on data repository 150.

The plurality of data repositories are connected over a communication network to an engineering data gateway 130. The engineering data gateway 130 is configured to convert engineering data, from any of the data repositories, from the initial data model to a graph database. This graph database is subsequently used by a configuration server 120 for generating one or more engineering artifacts. The term engineering artifacts includes system topology diagrams for the plant or facility, control logic diagrams, configuration files for controllers, Intelligent Electronic Devices, human machine interfaces and the like. The configuration server 120 is connected to the engineering data gateway 130 using a communication channel.

After generating the engineering artifacts, the configuration server 120 deploys the configuration files on the corresponding devices (shown in FIG. 1 as intelligent electronic device 115, intelligent electronic device 117 and human machine interface 119 of a flowmeter). The remaining engineering artifacts such as system topology diagrams, control logic diagrams, etc., are sent to the engineering data gateway 130. The engineering data gateway 130 stores (also referred to as persists) the remaining engineering artifacts in the corresponding data repositories if no similar engineering data is found, else the engineering data gateway 130 updates the engineering data in the data repositories according to the engineering artifacts generated by the configuration server 120.

In an embodiment, a data centric approach is used to store the remaining engineering artifacts or update engineering data in the data repositories by the engineering data gateway 130. The plurality of data repositories register with the engineering data gateway 130 by sending one or more subscription requests. Accordingly, the engineering data gateway 130 publishes the one or more engineering artifacts to the one or more data repositories.

In an embodiment, when a change is made to the persisted engineering artifact, the engineering data gateway 130 is configured to receive notification regarding the change and is able to validate the change by checking whether the change is conflicting or in compliance with the other engineering artifacts. By doing so, the engineering data gateway 130 is able to remove anomalies and conflicts among engineering data stored on the plurality of data repositories.

The configuration server 120 is connected to an engineering workstation 105. An engineer can interact and configure the configuration sever 120 using the engineering workstation 105. In an embodiment, the configuration server 120 generates one or more recommendations in relation to the one or more engineering artifacts in accordance to one or more predetermined rules. These recommendations are sent to the engineering workstation 105 for the engineer to select a recommendation on the basis of which the configuration server 120 will generate the engineering artifacts. In an embodiment, the engineering data gateway 130 assesses the impact of a modification on the engineering data and renders the assessed impact of the modification using the graph database on the engineering workstation 105. The aspects in relation to the configuration server 120 and the engineering data gateway 130 are explained further in the description of FIG. 2 using examples.

Figure 2:
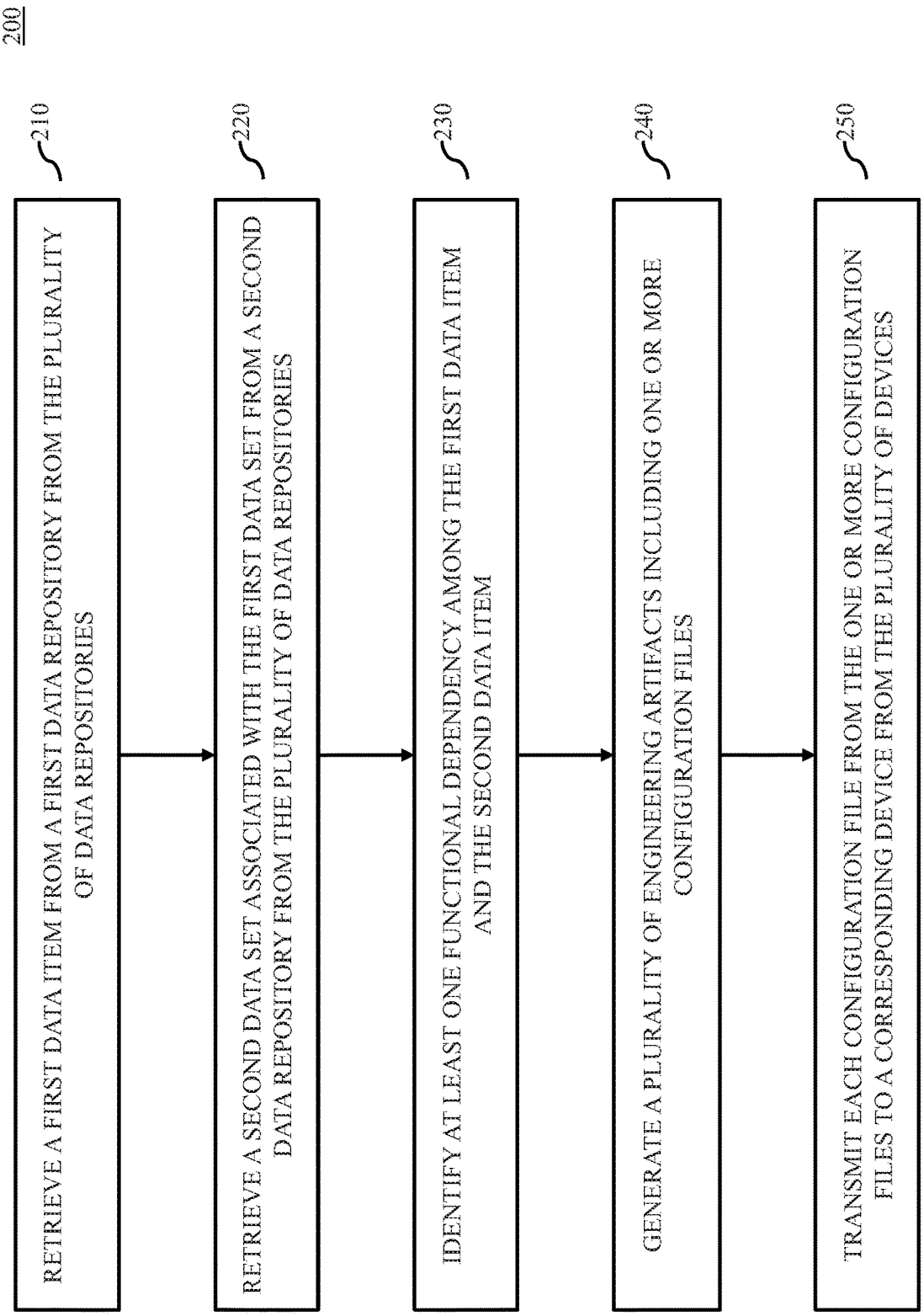
FIG. 2 illustrates a method for configuration of devices of a control system, in accordance with various embodiments of the present invention.

FIG. 2 illustrates a method 200 for configuration of devices (115, 117 and 119) of a control system, in accordance with various embodiments of the present invention. At step 210, the engineering data gateway 130 retrieves a first data set from a first data repository from the plurality of data repositories. In an embodiment, the configuration server 120 receives a command from the engineering workstation 105 to initiate the configuration of the devices (exemplarily shown in FIG. 1 as Intelligent electronic device 115, intelligent electronic device 117 and human machine interface 119 of a flowmeter) of the control system. Upon receiving the command, the configuration server 120 requests engineering data from the engineering data gateway 130. Accordingly, the engineering data gateway 130 retrieves the first data set from the first data repository. In an embodiment, the first data set is tag information generated from P&I diagrams. As mentioned herein, a data set refers to a collection of data items, and based on the context of the usage, is used interchangeably.

Figure 4:
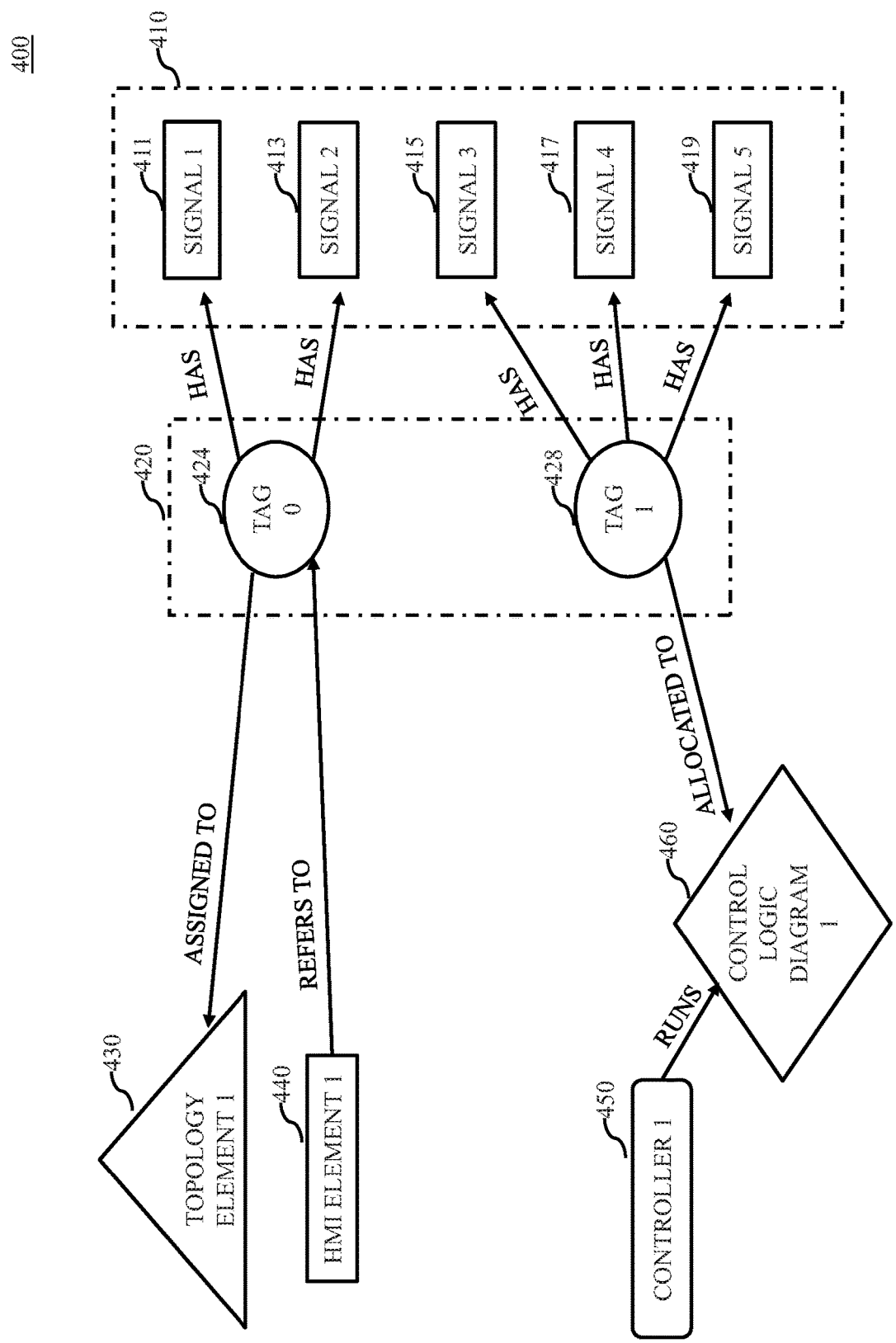
FIG. 4 exemplarily illustrates a graph database generated by an engineering data gateway, in accordance with various embodiments of the present invention.

At step 220, the engineering data gateway 130 retrieves one or more data sets that are associated with the first data sets from the corresponding data repositories. In an embodiment, the engineering data gateway 130 has one or more predetermined rules or criteria for identifying data sets associated with the first data item. For example, a rule could be that where the first data set is signal information, the engineering data gateway 130 will retrieve associated I/O module data set from the corresponding data repository. Similarly, another rule could be that where the first data set is I/O module information, the engineering data gateway 130 will retrieve associated controller data set and associated signal data set from the corresponding data repositories. In an embodiment, the engineering data gateway 130 is able to recursively retrieve data sets which are associated with the previously retrieved data sets. For example, as shown in FIG. 4, a tag 1 data item 428 is associated with signal 3 data item 415, signal 4 data item 417, signal 5 data item 419 and control logic diagram 460. Upon retrieving tag 1 data item 428, the engineering data gateway 130 will retrieve signal 3 data item 415, signal 4 data item 417, signal 5 data item 419 and control logic diagram 460, since signal 3 data item 415, signal 4 data item 417, signal 5 data item 419 and control logic diagram 460 are associated with previously retrieved tag 1 data item 428. Accordingly, the engineering data gateway 130 will also retrieve controller 1 data item 450, controller 1 data item 450 is associated with previously retrieved control logic diagram 460.

Additionally, in an embodiment, the engineering data gateway is capable of learning and identifying associations among data sets using previously retrieved data sets and can update the predetermined rules accordingly.

At step 230, the engineering data gateway 130 identifies one or more functional dependencies among the first data set and the one or more data sets. After retrieving the one or more data sets, the engineering data gateway 130 converts the first data set and the one or more data sets into a graph database. The functional dependencies between the data sets are identified by extracting relevant information from the various engineering tools and the corresponding data repositories through the application programming interfaces defined for the engineering tools.

Each vertex in the graph database corresponds to a data item. A vertex thus represents one of the following—a tag data item, a signal data item, an HMI data item, a topology data item, a control logic diagram data item, a controller data item, and the like. Each of data items have its own sub-categories and properties associated with it. For example, a controller device data item, c may be a type of network controller, and have associated input and output data items.

Figure 3:
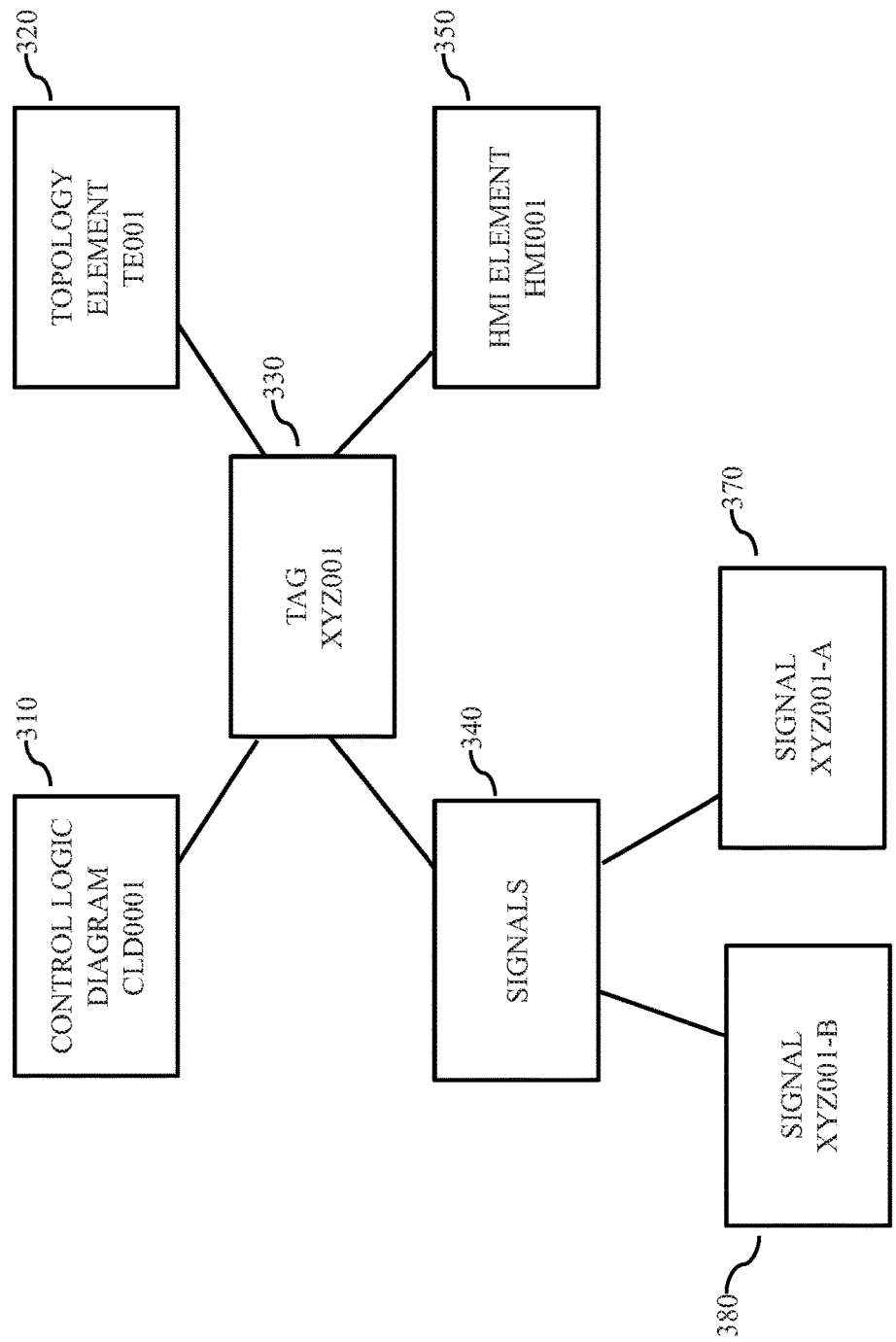
FIG. 3 exemplarily illustrates associations of a tag, in accordance with various embodiments of the present invention.

A functional dependency exists between different data items when one of them depends upon, or is assigned to another data item. For example, as shown in FIG. 3, a tag XYZ001 data item 330, which is a part of bulk engineering data repository, is assigned to a system topology: TE001 data item 320 which is a part of the system topology data item. Here, the relationship is loosely defined where one element is assigned to, and therefore is related to, another element. In the graph database, each functional dependency between system elements is represented as an edge between the vertices corresponding to the respective data items. Formally, then the graph database is defined as

G=(V, E), where V is a set of vertices (data items) and E is a set of edges (functional dependencies).

We define the set of vertices as a union (aggregation) of all data items i.e all the data sets

V=T∪R∪ST∪HE∪TE∪CLD∪C∪U∪P

Where,

T is the tag dataset items in the system

T={t|t is a tag data item in the industrial automation system}

R is the customer requirement data set from which the tag data items are derived R={r|r is a customer requirement data item, specified in plain text or pictorial form}

ST is the signal data set

ST={st|st is a signal data item defined for a tag data item}

HE is the HMI data set

HE={h|h is a faceplate or other graphical data item used in the system HMI}

TE is the system topology data set

TE={te|te is a system topology data item that represents a device in the system}

CLD is the Control Logic Diagram data set

CLD={cld|cld is a control l ogic diagram or application data items}

C is Controller data set used in the system

C={c|c is a controller data item in the system}

U is the set of all users of the system

U={u|u is a user of the system, with defined rights and tasks}

P is the set of all Projects defined for the system

P={p|p is an automation engineering project}

Each data item v∈V is defined as a triple <id, type, name>. The attribute id refers to the unique identifier for the data item. The type for the data item may be one of tag, signal tag, HMI element, topology element, control logic diagram, controller, user, or project. The attribute name refers to the display name for the data item.

Each edge in the graph represents a functional dependency between the two data items in the engineering system. An edge is defined to be unidirectional and is specified as a quadruple <id, source, destination, relation>. The attribute id refers to a unique identifier for the edge. The source and destination attributes refer to the respective source and destination data items between which the functional dependency exists. The attribute relation specifies the functional dependency, R, between the data items that the edge connects.

The functional dependency R can be one of {"implements", "has", "assigned_to", "allocated_to", "can_have", "used_by", "contains", "has_access_to", "run"}, and is characterized as
R: V×V, such that t "implements" r, iff t∈T, r∈R, and the requirement r is (at least partially) implemented by the tag t t "has" st, iff t∈T, st∈ST, and the tag t has the tag data item st associated with it t "assigned_to" te, iff t∈T, te∈TE, and the tag t is assigned to the system topology data item te st "allocated_to" cld, iff st∈ST, cld∈CLD, and tag element st is allocated to the control logic diagram data item cld he "refers_to" t, iff he∈HE, t∈T, and the HMI data item he refers to the tag t.

st "used_by" te, iff st∈ST, te∈TE, and the tag data item st is assigned to the topology data item te p "contains" v, iff p∈P, v∈{T, ST, TE, HE, CLD, C}, and project p contains system data item v u "has_access_to" p, iff u∈U, p∈P, and the user u has access to the project p c "runs" cld, iff c∈C, cld∈CLD, and the controller c runs the control logic diagram cld For example, as shown in figure, 413
  a tag $t_0$ 424 has two signals 411, and 413 associated with it, there is a relation "has" between to and each of the two signal data items;
  The edges may be defined as:
    $e_1 = (edge_1, t_0, s_1, \text{"has"})$
    $e_2 = (edge_2, t_0, s_2, \text{"has"})$
  if a tag $t_0$ 424 is assigned to a system topology element $te_1$ 430, then there is a relation "assigned_to" between the elements $t_1$ and $te_1$
  The edges may be defined as:
    $e_3 = (edge_3, t_1, te_1, \text{"assigned\_to"})$ Functional dependencies between different data items are either well-defined, or implicit. For example, in the bulk tag management tool, the functional dependency between a tag data item and a signal data item is well defined. That is, a tag data item can have one-to-many relationship with the signal data items. For example, as shown in FIG. 3, a tag XYZ001 data item 330 of a device such as pump, can be assigned to a system topology TE001 data item 320 in which case the relationship is loosely defined. The tag XYZ001 data item 330 is stored as an attribute in the system topology data repository. The engineering data gateway 130 reads this information and creates vertices for the tag XYZ001 data item 330, signal data items (shown in figure as signal XYZ001-A data item 370 and signal XYZ001-B data item 380) and system topology TE001 data item 320, and create edges by defining the type of functional dependency between the vertices. The engineering data gateway 130 formalizes all of these functional dependencies and represents them as edges between the various vertices in the graph database (as shown in FIG. 4). This is further explained by way of example provided below.

Conventionally, there is no explicit functional dependency defined in the automation engineering system relating signals with Control Logic Diagrams (CLDs). However, there is an implicit functional dependence between the two. The engineering data gateway 130 identifies implicit functional dependence by retrieving the tag data set and signal data set from the corresponding data repositories and mapping them to the individual control logic diagrams as defined in the Control Application Engineering tool and the data repository. Typically, signal elements correspond to external variables and communication variables in a CLD. At the same time, signals are derived from the tags as defined by the customer. Signals may also be standalone, derived directly from customer requirements. A CLD is an instance of a control logic template. Once a CLD is created, the individual parameters are mapped to specific signals as defined in the Bulk Engineering tool. An automated tool is used to extract the various signals and corresponding attributes from the Bulk Engineering system. Based on the specifications provided by the engineer, the signals are associated with corresponding parameters in the instantiated CLD.

In order to define the relation between signals and CLDs, the engineering data gateway 130 retrieves the signal and tag data set from the corresponding data repositories. Then, engineering data gateway 130 queries the control application engineering tool to extract information about the specific template data items that the signals are used by. The list of CLD data items related to the individual signal data items is then retrieved by enumerating the instances of these templates. After identifying the functional dependencies and creating the graph database, the engineering data gateway 130 sends the data sets and graph database to the configuration server 120.

At step 240, the configuration server 120 generates a plurality of engineering artifacts in an optimal manner using the data set and the graph database. This is further explained using example of system topology generation while engineering a power plant and its corresponding control system.

Engineering a power plant for a power generation automation project consists of series of engineering activities including bulk signal/tag list importing, system topology definition, control engineering, field device engineering, connectivity engineering, and operations deployment among others. A typical engineering project for a power plant consists of multiple process areas where each process area consists of a set of activities that takes inputs and produces outputs. An example for a process area would be a boiler area that consists of field devices such as pumps, transmitters, sensors, valves and a boiler. In engineering this boiler area is represented as a process area in the system topology and a layout is created with the system devices, networks and field devices. This layout defines the topographic layout of a particular process area but not the process layout. The difference is that this structure contains additional system level device details such as networks, firewalls, routers which are not part of a typical plant layout. The topology layout helps engineers to divide the plant in to process areas, assign system and field devices, configure devices and deploy the configuration to plant operations. There are several inputs for engineering such as signal list, cabinet list, plant layout diagrams, P&ID diagrams, etc. from the EPC companies. The signal list is input to the bulk engineering process where engineers perform bulk processing and allocation of signals to the controllers and publish to the bulk database. FIG. 5 shows a table 500 having a snapshot of the signal/IO list used in power plant automation.

The data processed during the bulk engineering process has ramifications across the engineering tools and tasks performed during project engineering. For example, in FIG. 5, the signal HPC-TAG 10 is allocated to controller HPC800 1-2, is of type Analog Input and must be instantiated with control logic template AIO1_Template. The control logic diagram is instantiated with the signals and is downloaded to a controller. The controller is one of several topology elements configured in the system topology drawing. The signals are downloaded to operations system as configuration data where they are wired to HMI elements in the operations workplace.

During the sales/proposal phase and the engineering phase of the control system of the power plant, the system topology is created and configured with specific details such as networks, controllers, workstations, firewalls, routers, etc. along with properties and attributes specific to each element in the topology using a system topology tool from the plurality of engineering tools. The configuration server 120 creates the topology artifact by reading the IO list data set and applying the relevant properties and connections in accordance with the identified functional dependencies. This allows for automatic generation of plant network and system topology and automatic configuration of the topology artifacts using the tag data set and signal data set.

The bulk engineering tool, in its corresponding data repository, maintains the detailed data model including details regarding the configuration of the signal data items, tag data items, etc. A subset of the data items stored in the data repository is of relevance to configuration server 120 while generating the system topology. For instance, a signal data item includes attributes such as signal type (e.g. analog in, analog out), device type (e.g. controller, workstation), location in plant, range, etc. that are relevant to the system topology.

For generating of the system topology, the data items having information in relation to controllers, IO modules, plant areas, functional units, hart allocations and Modbus allocation are of interest. This information is captured by the graph database and therefore the graph database includes attributes of data items which are used by the configuration server 120 to generate, configure, or define the topology artifacts and their associated attributes as well. The configuration server 120 queries the graph database and compiles a list of data items and the functional dependencies. This list of data items is iterated against a topology symbol list objects from the topology tool's domain model and the topology artifacts along with its attributes are generated by the configuration server 120. Using the functional dependencies, configuration server 120 identifies and generates the connections between the topology artifacts through data items that specify networks, ports, etc.

Among the plurality of engineering artifacts, the configuration server 120 generates configuration files for the devices of the control system. In an embodiment, the configuration server 120 generates one or more configuration files using the graph database. For example, by using the attributes of the I/O data items and control logic diagram data items, the configuration server 120 accordingly generates the configuration files which indicate the kind of signal to be sent on an I/O port of a controller. Similarly, on the basis of the functional dependencies among the data items, the configuration server 120 can create optimised configuration files. For example, when common control logic is utilised for a plurality of boilers, the configuration server 120 would, on basis of the identified functional dependencies, distribute the common control logic on a controller having higher number of I/O channels so as to ensure that network congestion is less.

At step 250, the one or more configuration files are transmitted or distributed to the devices of the control system where they are deployed. It is to be noted by a person skilled in the art that while the description provides for an example wherein engineering is carried out for commissioning of a plant, the current invention is also applicable in reengineering an existing plant or control system. Similarly, while the graph database is spare during commissioning, during maintenance and reengineering of the plant due to the presence of adequate information, functional dependencies identified and indicated by the graph database are relevant for optimal replacement of existing controllers and other such devices, and for optimal installation of new controllers and other such devices. Similarly, it is to be noted by a person skilled in the art that during commissioning, data sets from similar projects can be utilised in generating the graph database.

In an embodiment, the configuration server 120 is configured to configure existing engineering artifacts. In an example the data repository of the system topology tool consists of uninstantiated topology artifacts. The configuration server 120 instantiates and configures these topology artifacts using the graph database and the data set in accordance with one or more predetermined rules. For example, when a controller is instantiated it requires GUID, name, description, ports, IP address and other controller-specific attributes whose ownership is defined not by topology tool but the control engineering tool. Once the controller is instantiated part of the data is persisted in the topology DB and part in control engineering DB. When a controller is deleted, for example, topology needs to check with the control engineering tool since it is the CE tool that owns the object, not the topology. This is applicable for the multitude of present and future objects in the topology tool.

In an embodiment, the engineering data gateway 130 is able to reflect changes to data item in a data repository to other data items in other data repositories in order to maintain consistency using the identified functional dependencies. The engineer can choose to select the instantiated topology objects for editing or adding additional attributes relevant to the system topology tool. In order to maintain data consistency in the data repositories and the corresponding engineering tools, the engineering data gateway 130 synchronizes the changes by modifying the data items in accordance with the functional dependencies identified.

Similarly, in an embodiment, the engineering data gateway 130 can validate modifications or changes performed by an engineer to a data item. The engineering data gateway 130 performs validation of the proposed changes for a data item in relation to the functional dependencies with other data items and provides a list of errors or warnings in relation to conflicts and inconsistencies as well as recommendations that the engineer must fix before persisting the data to the data repository.

In an embodiment, the configuration server 120 can generate several alternative topology artifacts, for automation network and specific configurations as recommendations for the engineer to choose from. Recommendations are based on the pre-defined context and relevance derived the domain and maintained in form of domain rules for designing automation network topology and configuration of the automation network devices and objects.

Conventional method of designing the system topology and various other engineering artifacts and performing basic configurations steps manually using different tools makes the engineering activity very complex and tedious. For businesses which involve performing automation system engineering and commissioning, this results in increased commissioning costs. The present invention would enable for efficient engineering by reducing the engineering time by automating the process. With that, quicker delivery of engineering projects and services can be provided. Additionally, the present invention would improve engineering efficiency by reducing the probability of errors creeping into the industrial automation engineering system through impact analysis and dependency visualization to assess the impact of a change to a system element.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of configuring a plurality of devices of a control system using a configuration server connected to a plurality of data repositories using an engineering data gateway, wherein each data repository from the plurality of data repositories is associated with a corresponding engineering tool from a plurality of engineering tools, the method comprising:
    retrieving a first data set from a first data repository from the plurality of data repositories, wherein the first data set is stored in the first data repository in a first data model;
    retrieving a second data set associated with the first data set from a second data repository from the plurality of data repositories, wherein the second data set is stored in the second data repository in a second data model;
    identifying at least one functional dependency among the first data set and the second data set by converting the first data set and the second data sets to a graph database comprising a first node and a second node, created using the first data set and the second data set, and an edge between the first node and second node wherein the edge is indicative of the at least one functional dependency;
    generating a plurality of engineering artifacts including a configuration file and at least one of a system topology diagram, a control logic diagram, and a face plate of a human machine interface using the first data set and the second data set in accordance with the at least one functional dependency, where generating the plurality of engineering artifacts comprises assessing an impact of a modification on the first data set based on one or more relationships indicated as one or more edges in the graph database and rendering the assessed impact of the modification on the first data set using the graph database;
    generating one or more recommendations in relation to the plurality of engineering artifacts using the first data set and the second data set in accordance with the identified at least one functional dependency and one or more predetermined rules; and
    transmitting the configuration file to a corresponding device from the plurality of devices for commissioning the operation of the device.

2. The method as claimed in claim 1, further comprising validating the plurality of engineering artifacts upon modification of the plurality of engineering artifacts.

3. The method as claimed in claim 1, wherein generating a plurality of engineering artifacts includes configuring the plurality of engineering artifacts in accordance to one or more predetermined rules.

4. The method as claimed in claim 1, further comprising persisting the plurality of engineering artifacts in the corresponding plurality of data repositories, wherein the step of persisting comprises receiving one or more subscription requests from the plurality of data repositories, and publishing the plurality of engineering artifacts to the plurality of data repositories upon generation of the plurality of engineering artifacts.

5. A system for configuring a plurality of devices of a control system, the system comprising:
    a plurality of data repositories, wherein each data repository from the plurality of data repositories is associated with a corresponding engineering tool from a plurality of engineering tools;
    an engineering data gateway communicatively coupled to the plurality of data repositories, wherein the engineering data gateway is configured to convert one or more data sets from one or more data models to a graph database comprising a plurality of nodes, created using the one or more data sets, and a plurality of edges between the plurality of nodes wherein each edge from the plurality of edges is indicative of at least one functional dependency; and
    a configuration server operatively coupled to the plurality of data repositories using the engineering data gateway, wherein the configuration server is configured to:
        retrieve a first data set from a first data repository and a second data set from a second data repository,
        identify at least one functional dependency among the first data set and the second data set using the graph database,
        generate a plurality of engineering artifacts including a configuration file and at least one of a system topology diagram, a control logic diagram, and a face plate of a human machine interface, using the first data set and the second data set in accordance with the identified at least one functional dependency,
        generate one or more recommendations in relation to the plurality of engineering artifacts using the first data set and the second data set in accordance with the identified at least one functional dependency and one or more predetermined rules, and
        transmit the configuration file to a corresponding device from the plurality of devices for commissioning the operation of the corresponding device.

6. The system as claimed in claim 5, wherein the engineering data gateway persists the plurality of engineering artifacts in the corresponding plurality of data repositories.

7. The system as claimed in claim 6, wherein the engineering data gateway validates the plurality of engineering artifacts upon modification of the plurality of engineering artifacts prior to persisting the plurality of engineering artifacts.

8. The system as claimed in claim 5, wherein the configuration server generates the plurality of engineering artifacts by assessing an impact of a modification on the first data set based on one or more relationships indicated as one or more edges in the graph database and rendering the assessed impact of the modification on the first data set using the graph database.

* * * * *